United States Patent
Gardiner

[11] Patent Number: 6,025,831
[45] Date of Patent: Feb. 15, 2000

[54] METHOD AND APPARATUS FOR ACCURATE CONTROLS INPUT

[75] Inventor: Mark S. Gardiner, Portland, Oreg.

[73] Assignee: AvroTec, Inc., Portland, Oreg.

[21] Appl. No.: 08/974,044

[22] Filed: Nov. 19, 1997

[51] Int. Cl.[7] ................................................ G09G 5/08
[52] U.S. Cl. .............................................. 345/157; 345/156
[58] Field of Search ...................................... 345/156, 157, 345/158, 168, 169, 163, 167, 901, 903, 905; 361/680, 681; 74/471 XY, 471 R; 364/708.1, 709.01, 709.1

[56] References Cited

U.S. PATENT DOCUMENTS

| 5,506,375 | 4/1996 | Kikuchi ..................................... 345/158 |
| 5,847,696 | 12/1998 | Itoh et al. ................................ 345/163 |

OTHER PUBLICATIONS

Nordwall, Bruce D., "Collins Emphasizes Cockpit Graphics", *Aviation Week & Space Technology*, Sep. 22, 1997, p. 71.

"Flight–Deck Displays on the Boeing 777: Interactive display capabilities will improve pilot workload and situational awareness while providing economic benefits to airlines", *Aerospace Engineering*, Dec. 1994, pp. 11–16.

"Honeywell Shows Off The New Primus EPIC", *NBAA Convention News*, vol. 29, No. 17, Sep. 25, 1997, Dallas, Texas, cover page and p. 19.

*Primary Examiner*—Xiao Wu
*Attorney, Agent, or Firm*—Blakely Sokoloff Taylor & Zafman, LLP

[57] ABSTRACT

The present invention is an input device for accurate controls input. The input device includes a control case having a number of controls. In accordance with a first aspect of the present invention, the input device further includes a palm rest adjustably coupled to the control case. The adjustable palm rest facilitates accurate manipulation of controls on the control case by a user having one of a number of hand sizes, notwithstanding motion in the user's environment. In accordance with a second aspect of the present invention, the control case is also adjustably coupled to a base. The adjustable control case also facilitates accurate manipulation of controls on the control case by a user having one of a number of arm lengths, notwithstanding motion in the user's environment.

13 Claims, 5 Drawing Sheets

METHOD AND APPARATUS FOR ACCURATE CONTROLS INPUT

FIELD OF THE INVENTION

The present invention pertains to input devices. More particularly, the present invention is an input device for accurate controls input.

BACKGROUND

Computers have increasingly found their way into control systems of various mobile vehicles. For the purposes of this application, mobile vehicles includes but is not limited to all types of aircraft, spacecraft, submersibles, water craft, hover craft, wheeled vehicles, tracked vehicles, and the like. Computers have proven especially useful, for example, in aircraft because pilots are provided with a vast array of information from numerous different sources. An on-board computer can help to sort through the information and display it in a coherent manner. In complex vehicles, like aircraft, the computer also controls a number of different systems such as navigation and communications. Therefore, interaction with an on-board computer while a vehicle is in motion has become increasingly important.

Inherent in mobile vehicles, like aircraft, is erratic motion. For instance, aircraft encounter turbulence, and may perform drastic aerial maneuvers. Automobiles go over bumps, and turn sharp corners. Water craft encounter rough seas and high winds.

Erratic motion is especially prevalent in military vehicles. Fighter pilots subject their planes and themselves to violent directional changes. Military land craft, like army tanks, travel at high speed over severely rough terrain. Military and Coast Guard vessels frequently venture into rough seas.

Often, it is during times of extremely erratic motion that accurate computer and instrument input is most important. For instance, a pilot of a passenger plane loaded with people will be particularly interested in maintaining control of the air craft during a violent thunderstorm. Similarly, a gunner in a military tank or on a military ship may need to enter coordinates on a tactical computer while the vehicle is traveling at high speed.

Passengers in a vehicle may also interact with computers. For instance, a passenger may play a computer game at his or her seat during a commercial airline flight, either with an on-board computer or a personal computer. Likewise, a passenger in a private airplane may want to plot a course, for example, to the next world class golf course. In all of these situations, accurate computer or device input can be important and may be critical.

Conventional cursor control devices, such as a mouse or a track ball, embodied in their typical form factor for use with a desktop computer, however, are much too unstable. For instance, the typical mouse cannot provide the degree of stability necessary when the desk top is vibrating and being jostled back and forth. A standard computer key board has similar limitations in that it is difficult to type when the keyboard is bouncing up and down. Many standard keyboards are also too large to be practical in mobile applications.

Therefore, it would be beneficial to provide an input device for use in mobile vehicles that allows accurate computer and device input.

SUMMARY OF THE INVENTION

The present invention is an input device for accurate controls input. The input device includes a control case having a number of controls. In accordance with a first aspect of the present invention, the input device further includes a palm rest adjustably coupled to the control case. The adjustable palm rest facilitates accurate manipulation of controls on the control case by a user having one of a number of hand sizes, notwithstanding motion in the user's environment. In accordance with a second aspect of the present invention, the control case is also adjustably coupled to a base. The adjustable control case also facilitates accurate manipulation of controls on the control case by a user having one of a number of arm lengths, notwithstanding motion in the user's environment.

BRIEF DESCRIPTION OF THE DRAWINGS

Examples of the present invention are illustrated in the accompanying drawings. The accompanying drawings, however, do not limit the scope of the present invention in any way. Like references in the drawings indicate similar elements.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Figure 1:
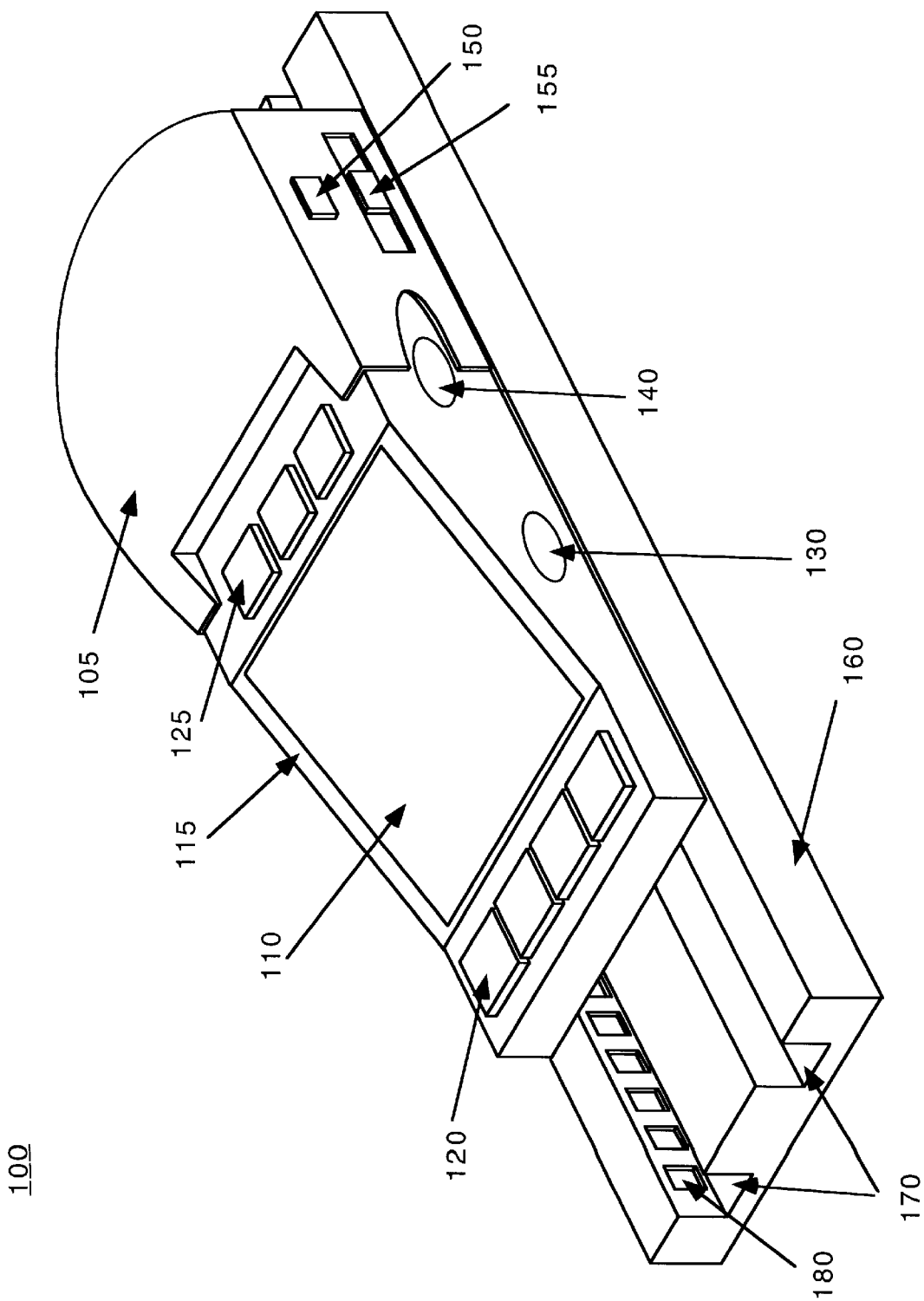
FIG. 1 illustrates one embodiment of the input device with one possible control configuration.

FIG. 1 shows one embodiment of input device 100. Input device 100 is designed so that a user can rest his or her palm on palm rest 105. Palm rest 105 is ergonomically designed and adjustably connected to control case 115 to comfortably fit a wide range of hand sizes. As a result, the controls on control case 115 can be accurately operated by moving only the fingers while the hand remains stationary on palm rest 105 for hands of any one of a number of different hand sizes. In a mobile vehicle, then, during erratic motion, a user can still accurately operate the controls because the user's hand can be held firmly in place. Many palm rest and control case shapes are possible in other embodiments.

Control case 115, in the embodiment shown in FIG. 1, includes a pointing device 110, and input and auxiliary input buttons 120, 125, 130, and 140. The pointing device is used for cursor control and point entry. Many devices could be used for pointing, such as a touchpad, a trackball, a joystick, a 360 degree rocker switch, a button key pad, a concentric round knob or knobs, or any number of other manufacturer or avionics installation modules. The pointing devices can be modular so that they can be interchanged for different embodiments and/or according to user preference. These devices, i.e., a touchpad, etc., are known in the art, and accordingly will not be functionally described.

All of the controls can be software or hardware configured using any of a number of software techniques or hardware circuitry known in the art. The controls can be configurable for left or right hand operation, and configured to control a wide range of devices. The pointing device could be configured for a range of pointing speed and accuracy. In the embodiment of FIG. 1, buttons 120 could be used to select one of several different devices. For instance, the user could press one button to activate the navigation computer. Then, the pointing device could be used to select input fields within the navigation computer screen. Other buttons could be used to select environment controls, radio tuning, intercom activation, voice computer input, or a variety of other devices. In other embodiments, any number of buttons and/or pointing devices could be configured on the control case. The control case could also be configured to control any number of devices by using various forms of input menus and decision trees.

Buttons 130 and 140 could be configured to operate similar to buttons on a standard mouse. The user could point the cursor using the pointing device, and click either button 130 or 140 to input information. The buttons could be redundant in order to accommodate different hand sizes, or the buttons could be configured for different purposes.

Palm rest adjustment button 150, when depressed, allows palm rest 105 to slide back and forth on control case 115, as will be discussed in more detail below. In the embodiment of FIG. 1, palm rest 105 has cutaway sections so that buttons 125, 140, and 155 remain accessible while palm rest 105 is moved back and forth.

Also shown in FIG. 1 is base 160. In this embodiment, control case 115 is adjustably coupled to base 160 via tracks 170. Longitudinal rails (not shown) on the bottom of control case 115 fit into tracks 170. By pressing adjustment button 155, a user can slide the control case relative to the base, as discussed in more detail below.

Base 160 can be mounted adjacent to a seat in a mobile vehicle. For instance, base 160 can be mounted on a center console next to a user's seat, and a user (who might also be the operator of the mobile vehicle) can adjust the position of input device 100 to find a comfortable and natural arm position.

A wide range of arm lengths could be accommodated wherein virtually any user could use the device with his or her arm in a partially extended position. In this way, a user, seat-belted into position, would always be able to easily reach and accurately operate the input device.

In other embodiments, the input device may have only the palm rest adjustment or the arm length adjust, rather than both. With both a palm rest position adjustment and a control case position adjustment, however, a wider range of users would be able to comfortably and accurately use the input device in an ergonomic position.

Figure 2:
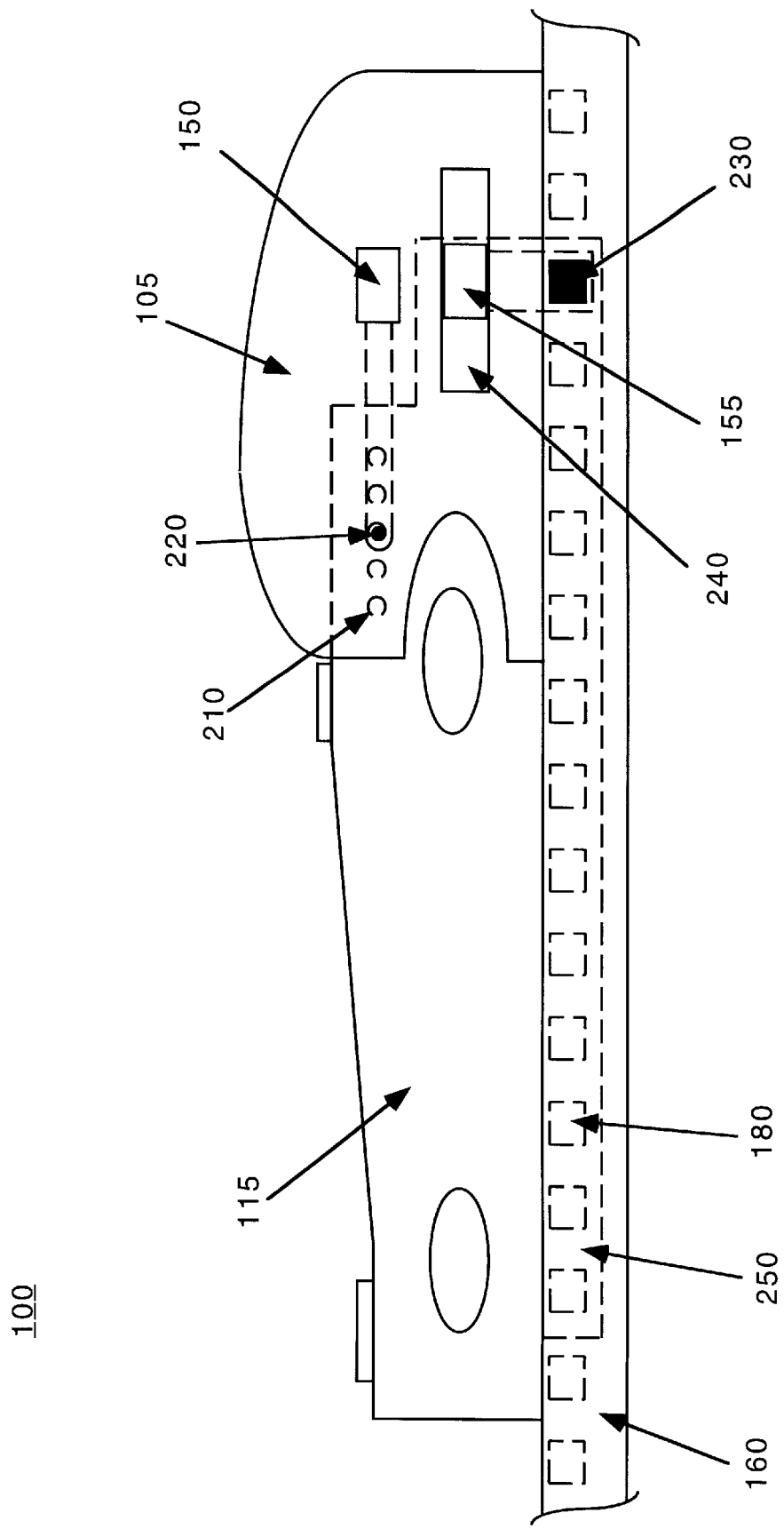
FIG. 2 illustrates one embodiment of the input device with a detention lockable palm rest position adjustment and a detention lockable control case position adjustment.

FIG. 2 illustrates one embodiment of detention lockable position adjustments for palm rest 105 and control case 115. Control case 115 includes a series of holes 210. When palm rest adjustment button 150 is pressed, tab 220 is pushed out of one of the holes 210. Palm rest 105 is then free to slide back and forth. When adjustment button 150 is released, tab 220 snaps into one of holes 210, locking palm rest 105 into place.

Base 160 includes a series of holes 180 in tracks 170. When control case adjustment button 155 is pressed, tab 230 is pushed out of one of the holes 180. Control case 115 is then free to slide back and forth. When adjustment button 155 is released, tab 230 snaps into one of the holes 180, locking control case 115 into place.

Palm rest 105 also includes cutaway slot 240 from which adjustment button 155 protrudes. Button 155 is fixed in relation to control case 115, so slot 240 allows palm rest 105 to be moved back and forth.

Figure 3:
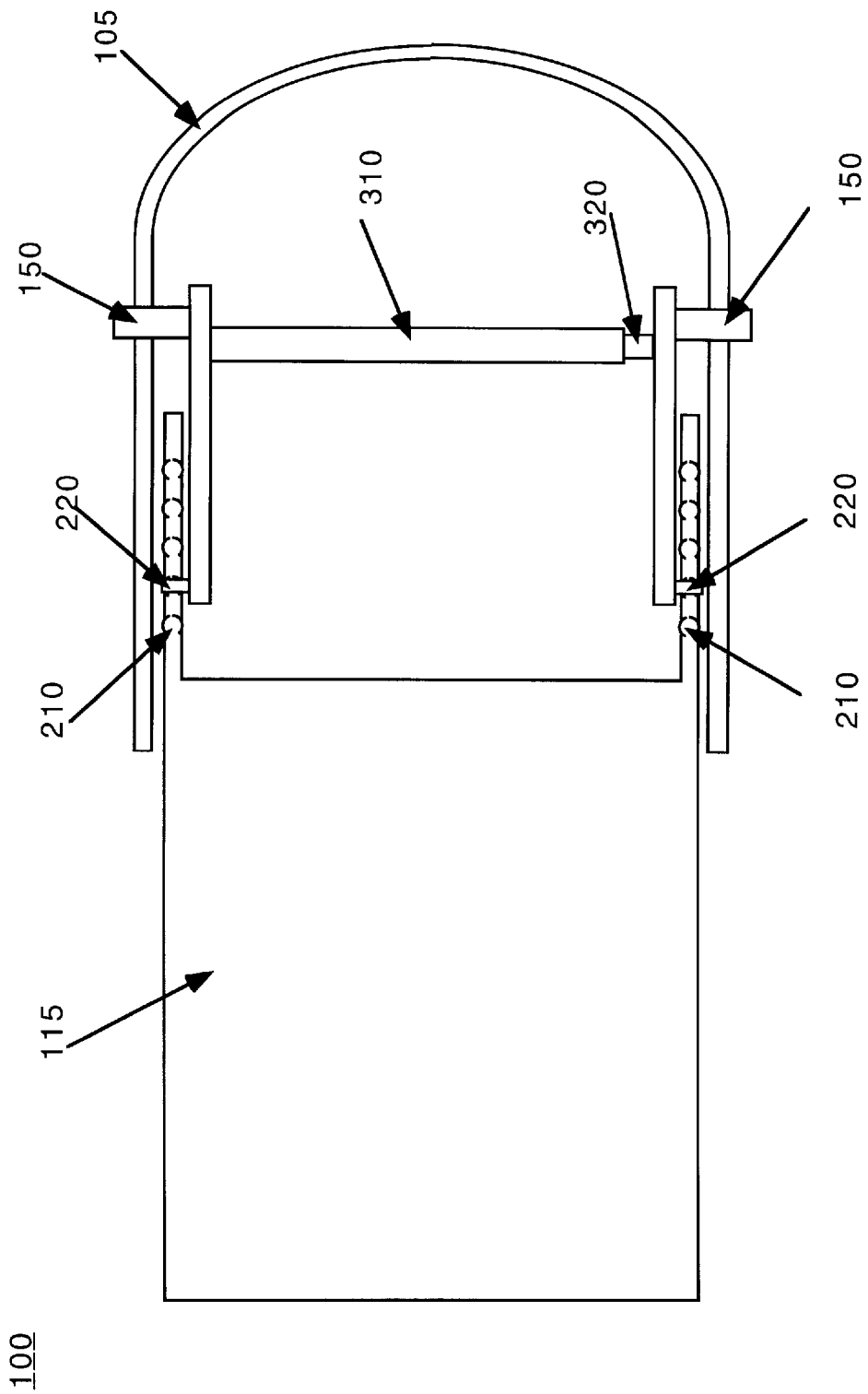
FIG. 3 illustrates one embodiment of a cross-section of the input device with a detention lockable palm rest adjustment.

FIG. 3 illustrates a cross-sectional view of one embodiment of the input device as seen from above. Control case 115 includes two sets of holes 210. Palm rest 105 includes two adjustment buttons 150. When both buttons 150 are pressed at the same time, plunger shaft 320 depresses a spring (not shown) in spring sleeve 310. Tabs 220 are pushed out of corresponding holes 210, and palm rest 105 is free to slide back and forth. When buttons 150 are released, the spring in spring sleeve 310 pushes plunger shaft 320 out, and tabs 220 snap into corresponding holes 210. In this manner, the position of palm rest 105 is detention lockable.

Figure 4:
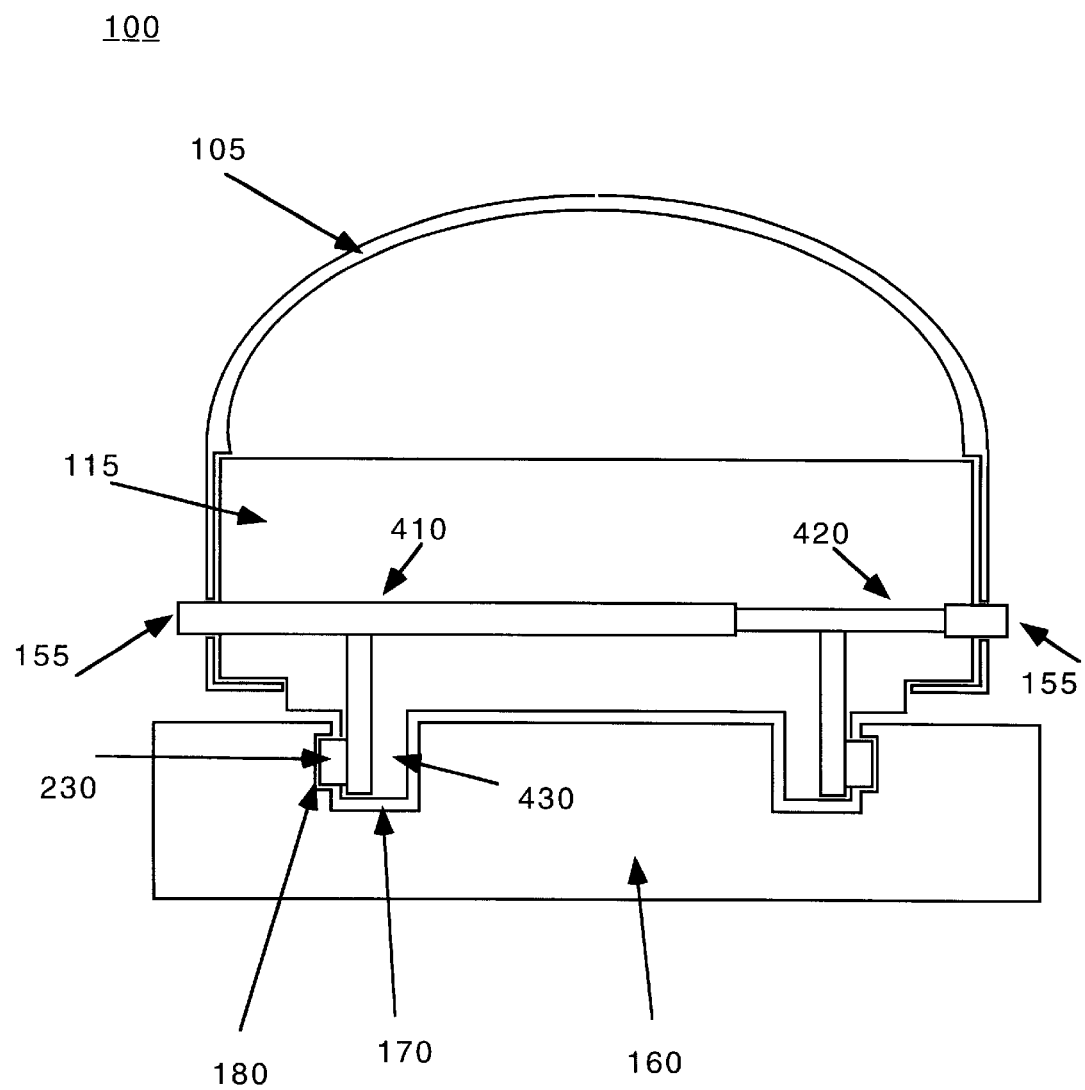
FIG. 4 illustrates one embodiment of a cross-section of the input device with a detention lockable control case adjustment.
Figure 5A:
FIGS. 5A–G illustrate a number of example mobile vehicles in which the input device can be used.
Figure 5B:
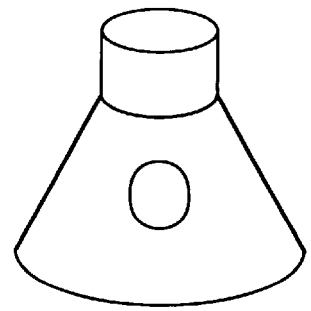
Figure 5C:
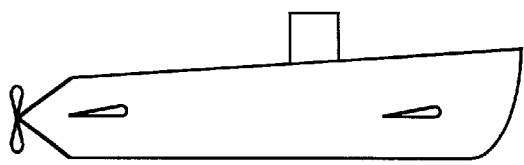
Figure 5D:
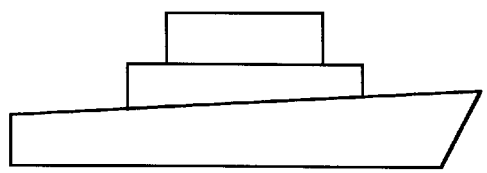
Figure 5E:
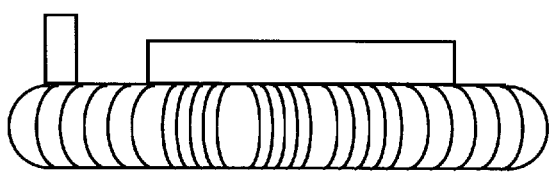
Figure 5F:
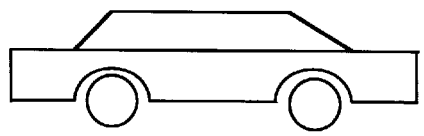
Figure 5G:
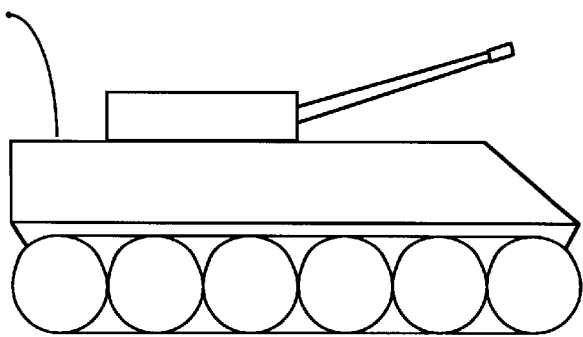

FIG. 4 illustrates a cross-sectional view of one embodiment of the input device as seen from behind. The locking mechanism for palm rest 105 discussed above is not shown in FIG. 4 for clarity. In FIG. 4, base 160 has two tracks 170. Each track includes a set of holes 180. A pair of buttons 155 extend from control case 115, and protrude through palm rest 105 through slots 240, as discussed above for FIG. 2. The cross-sectional shape of control case 115 and palm rest 105 form tracks to allow palm rest 105 to slide back and forth over control case 115 as discussed above.

When buttons 155 are pressed simultaneously, plunger shaft 420 depresses a spring (not shown) in spring sleeve 410. Tabs 230, which extend from control case rails 430, are pushed out of corresponding holes 180, and control case 115 is free to slide back and forth. When buttons 155 are released, the spring in spring sleeve 410 pushes plunger shaft 420 out, and tabs 230 snap into corresponding holes 180. In this manner, the position of control case 115 is detention lockable.

Various other locking mechanisms can be used between the palm rest and the control case, and between the control case and the base. For example, threaded holes and screws, friction stops, locking pins, or a single threaded axial shaft and a complementary fixed threaded receptor could be employed.

Various other embodiments could be used to adjust the position of the palm rest relative to the control case, and the control case relative to the base. Numerous track designs are possible, such as a single "T" shaped track with a corresponding groove.

Various other position adjusting approaches could be employed without using tracks at all. For instance, the palm rest could be screwed into position on the control case with removable screws and a variety of screw hole positions. Alternately, the control case, for example, could be designed with tabs that can snap into a series of receptor holes in the base.

In another embodiment, both the palm rest and the control case could be adjustably attached directly to the base. In this case, the palm rest would be indirectly coupled to the control case.

FIGS. 5A–G illustrate a number of mobile vehicles in which input device 100 could be used. The device could be used in any kind of air craft, space craft, submersible, water craft, hover craft, or land craft, including but not limited to wheeled and tracked vehicles. The invention could be used by the pilot of the vehicle, the crew, or the passengers.

The invention can be designed as appropriate for a variety of different implementations. For instance, it could be shielded against electromagnetic interference and high intensity radio frequency signals. It could be made burn resistant, water resistant, resistant to sudden changes in temperature and pressure, and operable in a vacuum. It could also be impact resistant with a high crush strength. It could be constructed of metal, plastic, or a variety of other materials.

The ergonomic shape of the palm rest and ergonomic position of the input device also serve to identify the input device by feel. A user does not need to focus on the device or even be able to see it in order to use it.

The input device could also be modular and interchangeable for easy replacement or installation in various locations. A number of mounting locations could be positioned throughout a vehicle. For instance, the device could be situated for left or right hand use by mounting the base on either side of a seat. There could be mounting options in a cock pit, for example, for an outboard arm rest position, an outboard panel mounted position, an inboard arm rest position, a pedestal option, or a console option.

Controls on the control case could be connected to devices via plug-installation cabling, allowing for many installation options. The connections could comply with Universal Serial Bus (USB) Specification v1.0, published by Promoters of USB, c/o Intel Corporation, Santa Clara, Calif., or with High Performance Serial Bus (Standard P1394) of the Institute of Electrical and Electronic Engineers Inc. (IEEE), Draft 8.0v2, published Jul. 7, 1995. Alternately, other forms of connection could be used, such as wireless communication.

In alternate embodiments, the base could be mounted in the vehicle by a hinged support bracket, or by a number of hinged segments. In this case, for instance, the input device could be moved about and locked into place for use by more than one person. Alternately, the input device could telescope out of a console and lock into position. In all of these situations, the input device could be moved out of the way when it was not in use, or to allow the user to enter and leave his or her seat more comfortably.

In one embodiment, the input device can include a control for any of a number of voice command devices. For instance, a pilot of an aircraft could use the pointing device to select a field on a computer screen, press the voice command control on the input device, and verbally enter data.

The ergonomic design of the invention makes it comfortable to use for any kind of input application, whether mobile or not. In stationary applications, the device may prove helpful to users with repetitive motion injuries, or useful in preventing repetitive motion injuries, such as carpal tunnel. The device may prove helpful to certain handicap users as well. For instance, the control case could be fitted with a Braille output device, in addition to a pointing device and control buttons, for a blind user. A user suffering from Parkinson's disease, or any user with uncontrollable shaking, may be able accurately use the device.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

What is claimed is:

1. An apparatus comprising:

a control case having controls disposed thereon;

a palm rest adjustably coupled to the control case, wherein the palm rest facilitates accurate manipulation of the controls on the control case by a user having one of a number of hand sizes, notwithstanding motion in the user's environment, and a base, said control case adjustably coupled to the base, wherein the control case facilitates accurate manipulation of the controls on the control case by a user having one of a number of arm lengths, notwithstanding motion in the user's environment.

2. The apparatus of claim 1 further comprising:

tracks incorporated into at least one of the control case and the palm rest, wherein the palm rest is to slideably couple to the control case via the tracks.

3. The apparatus of claim 1 wherein a position of the palm rest relative to the control case is lockable and adjustable to accommodate the number of hand sizes, wherein a hand size is accommodated if controls on the control case can be reached with fingers of the hand while a palm of the hand rests on the palm rest.

4. The apparatus of claim 1 wherein the apparatus includes at least one of a pointing device for cursor control, one or more input buttons, one or more auxiliary input buttons, one or more palm rest position adjustment buttons, and one or more control case position adjustment buttons.

5. The apparatus of claim 4 wherein the pointing device is one of a touchpad, a 360 degree rocker switch, a trackball, a joystick, a concentric round knob, and a button key pad.

6. The apparatus of claim 1 wherein the apparatus is operative to control a plurality of devices, wherein the plurality of devices includes at least one of a computer pointing and input device, a radio tuning device, a intercom activation device, a voice computer input device, and environment controls.

7. The apparatus of claim 1 wherein the apparatus is coupled to a plurality of devices by at least one of a wired connection and a wireless connection.

8. The apparatus of claim 1 wherein the apparatus is shielded against at least one of electromagnetic interference, burns, changes in pressurization, and high intensity radio frequency signals.

9. The apparatus of claim 1 further comprising:

tracks incorporated into at least one of the base and the control case, wherein the control case is to slideably couple to the base via the tracks.

10. The apparatus of claim 1 wherein a position of the control case relative to the base is lockable and adjustable to accommodate the number of arm lengths, wherein an arm length is accommodated if a hand of the arm reaches a palm position while the arm is in a partially extended position.

11. An apparatus comprising:

means for housing controls;

means, adjustably coupled to the means for housing controls, for resting a palm, wherein accurate manipulation of housed controls by a user having one of a number of hand sizes is facilitated, notwithstanding motion in the user's environment; and means for adjustably supporting the means for housing controls, wherein accurate manipulation of the housed controls by a user having one of a number of arm lengths is facilitated, notwithstanding motion in the user's environment.

12. A method comprising:

adjusting a position of a control case, adjustably coupled to a base, relative to the base, wherein accurate manipulation of controls on the control case by a user having one of a number of arm lengths is facilitated, notwithstanding motion in the user's environment; and adjusting a position of a palm rest, adjustably coupled to the control case, relative to the control case, wherein accurate manipulation of the controls on the control case by a user having one of a number of hand sizes is facilitated, notwithstanding motion in the user's environment.

13. An apparatus comprising:

a control case having controls disposed thereon;

a palm rest adjustably coupled to the control case, wherein the palm rest facilitates accurate manipulation of the controls on the control case by a user having one of a number of hand sizes, wherein the user's hand remains stationary while the user's fingers manipulate the controls; and a base, the control case adjustably coupled to the base, wherein the control case facilitates accurate manipulation of the controls on the control case by a user having one of a number of arm lengths, wherein the user's hand remains stationary while the user's fingers manipulate the controls.

* * * * *